(12) United States Patent
Easton et al.

(10) Patent No.: US 7,648,002 B2
(45) Date of Patent: Jan. 19, 2010

(54) VEHICLE WITH COORDINATED ACKERMAN AND DIFFERENTIAL STEERING

(75) Inventors: David Joseph Easton, Cedar Falls, IA (US); Bruce Craig Newendorp, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 160 days.

(21) Appl. No.: 11/760,416

(22) Filed: Jun. 8, 2007

(65) Prior Publication Data

US 2008/0302593 A1 Dec. 11, 2008

(51) Int. Cl.
*B62D 5/00* (2006.01)
(52) U.S. Cl. ..................... 180/408; 180/6.44
(58) Field of Classification Search .......... 180/408, 180/6.44, 412, 415, 446
See application file for complete search history.

(56) References Cited

U.S. PATENT DOCUMENTS

| | | | | |
|---|---|---|---|---|
| 5,265,020 A * | 11/1993 | Nakayama | ................. | 701/36 |
| 5,469,928 A * | 11/1995 | Adler et al. | ................. | 180/6.28 |
| 6,000,490 A | 12/1999 | Easton | | |
| 6,039,132 A * | 3/2000 | Easton | ................. | 180/6.44 |
| 6,208,922 B1 * | 3/2001 | Easton | ................. | 701/41 |
| 6,298,931 B1 * | 10/2001 | Easton | ................. | 180/6.44 |
| 6,345,674 B1 * | 2/2002 | Easton | ................. | 180/6.44 |
| 6,530,442 B1 * | 3/2003 | Satzler | ................. | 180/6.26 |
| 6,988,570 B2 * | 1/2006 | Takeuchi | ................. | 180/6.48 |
| 7,017,327 B2 * | 3/2006 | Hunt et al. | ................. | 56/14.7 |
| 7,188,011 B2 * | 3/2007 | Shirley et al. | ................. | 701/36 |
| 7,290,633 B2 * | 11/2007 | Kasten et al. | ................. | 180/248 |
| 7,415,823 B2 * | 8/2008 | Iwaki et al. | ................. | 60/487 |
| 2006/0047391 A1 * | 3/2006 | Katou | ................. | 701/41 |
| 2007/0176488 A1 * | 8/2007 | Miyajima et al. | ................. | 303/146 |

\* cited by examiner

*Primary Examiner*—Tony H. Winner

(57) ABSTRACT

The invention relates to a vehicle with coordinated steering. There is a need for a vehicle wherein Ackerman steered front wheels are coordinated with differentially steered and driven rear wheels. Such a vehicle includes Ackerman steerable front wheels and differentially driven left and right rear wheels. A steered wheel angle sensor is coupled to the front wheels and generates a steered wheel angle value. A front steering unit steers the front wheels and a differential drive unit drives the rear wheels. A control unit is coupled to the steering input sensor, to the steered wheel angle sensor, and to the front steering unit and the differential drive unit. The control unit generates the front steering control signal and the rear drive/steering control signal, and coordinates the steering operation of the front wheels with the differential steering/driving of the rear wheels.

2 Claims, 4 Drawing Sheets

VEHICLE WITH COORDINATED ACKERMAN AND DIFFERENTIAL STEERING

FIELD OF THE INVENTION

The present invention relates to a steering system for a vehicle which has conventional Ackerman steered front wheels and speed differentially controlled rear wheels.

BACKGROUND OF THE INVENTION

A tracked vehicle with speed differential steering and a non-spring centered steering wheel input sensor is described in U.S. Pat. Nos. 6,039,132, issued in March 2000 and 6,208, 922, issued in March 2001, both assigned to the assignee of the present application. It is desired to have a vehicle with Ackerman steered front wheels and with rear wheels which are speed differentially controlled to assist with the steering of the front wheels. In such a vehicle it would be desirable to coordinate the steering operation of the front and rear wheels.

SUMMARY OF THE INVENTION

Accordingly, an object of this invention is to provide a vehicle with a non-spring centered steering wheel input sensor, with electro-hydraulically controlled Ackerman steered front wheels and with rear wheels which are speed differentially controlled to assist with the steering of the front wheels.

A further object of the invention is to provide such a vehicle with coordinates steering operation of the front and rear wheels.

A further object of the invention is to provide such a such a vehicle with a steering system which does not require a phasing movement of the steered wheels upon startup.

These and other objects are achieved by the present invention, wherein a vehicle includes a steering wheel coupled to a non-spring centered rotatable steering input sensor which generates a steering wheel position signal. The vehicle includes Ackerman steerable front wheels and differentially driven left and right rear drive wheels. A steered wheel angle sensor is coupled to the front wheels and generates a steered wheel angle signal. A front steering unit steers the front wheels in response to a front steering control signal. A differential drive unit drives and differentially steers the rear wheels in response to a rear drive/steering control signal. A control unit is coupled to the steering input sensor, the steered wheel angle sensor, the front steering unit and the differential drive unit. The control unit generates the front steering control signal and the rear drive/steering control signal, and the control unit thus coordinates differential driving of the rear wheels with steering operation of the front wheels. Upon startup, the control unit sets the steering wheel position value according to the steered wheel angle signal. After startup, the control unit calculates a desired front steering angle value by multiplying the steering wheel position signal by a first constant, calculates a steering angle error by subtracting the steered wheel angle signal from the desired front steering angle value, and generates the front steering control signal by multiplying the steering angle error by a second constant.

DESCRIPTION OF THE PREFERRED EMBODIMENT

Figure 1A:
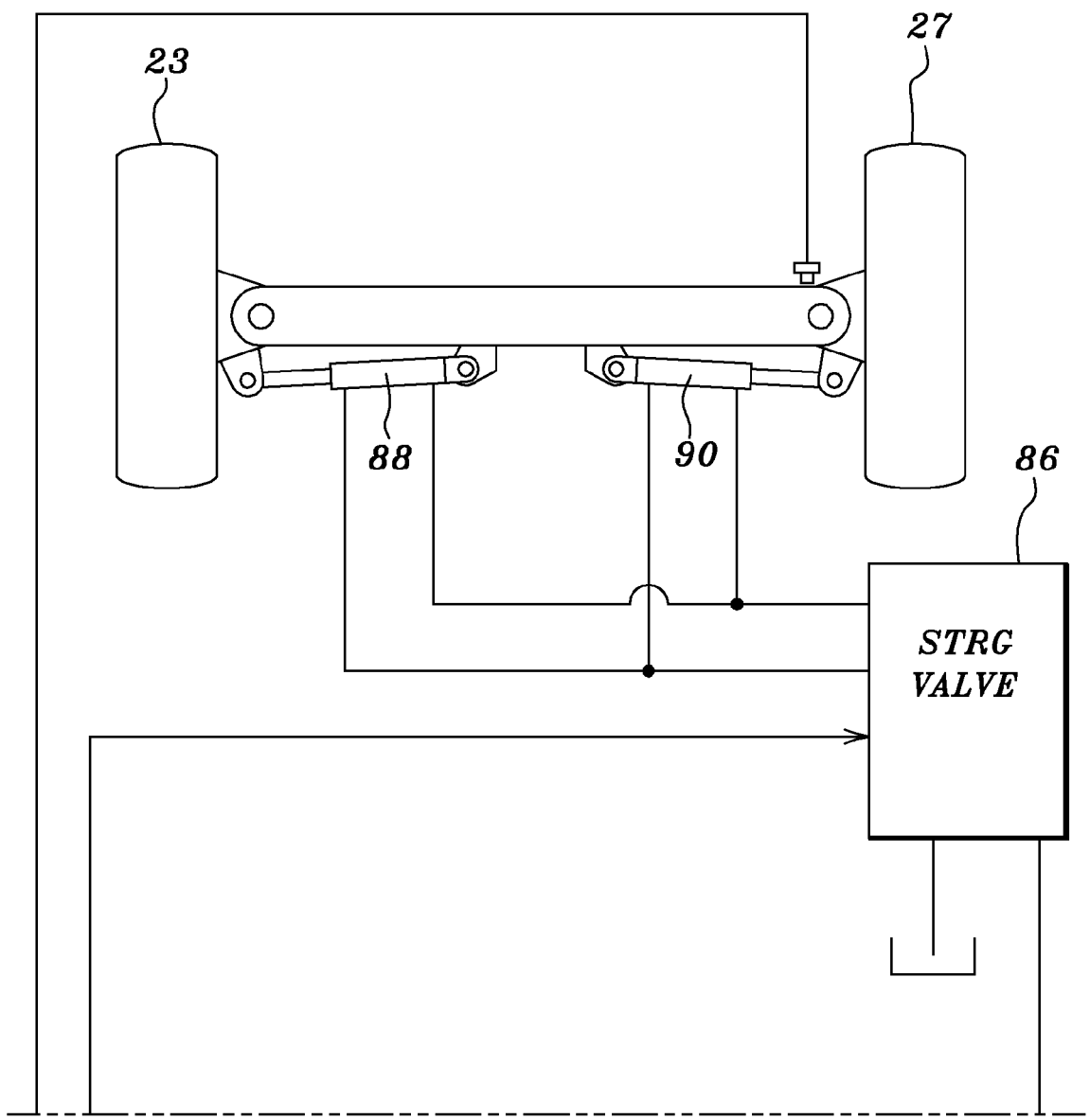
FIG. 1 is a simplified schematic diagram of a vehicle according to the present invention.
Figure 1B:
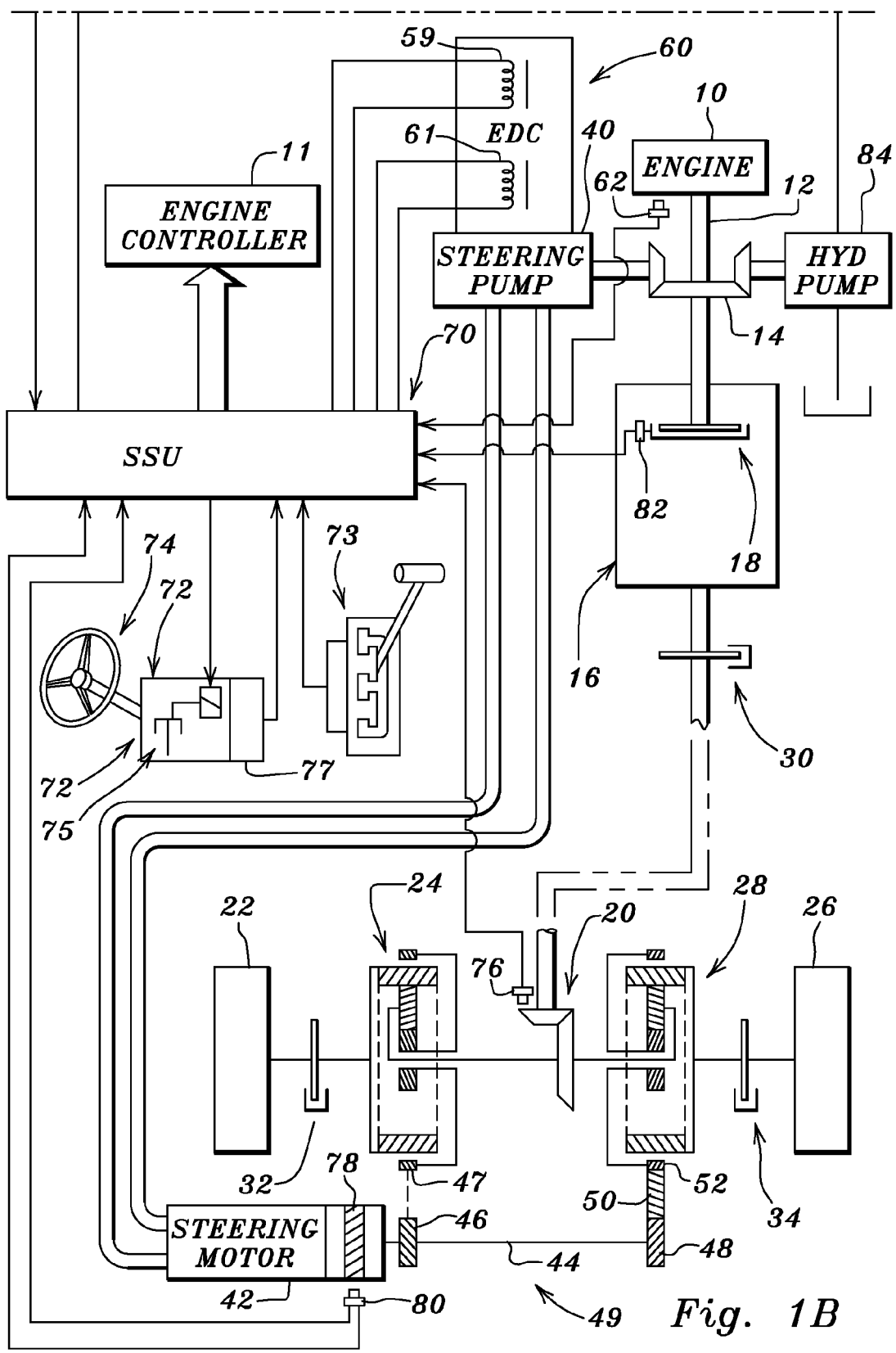

Referring to FIG. 1, a vehicle drive and steering system includes an engine 10 has an output shaft 12 which drives a right angle gear 14 and a transmission 16, such as a 16-speed powershift transmission which is available on production John Deere 8000T tractors. The transmission 16 includes hydraulically operated clutches and brakes (not shown), various ones of which will operate as a main clutch 18 in response to a conventional clutch pedal and linkage (not shown). The engine 10 is controlled by an electronic engine control unit 11.

The transmission 16 drives a final or right angle drive 20, which drives a left drive wheel 22 via left steering planetary drive 24, and a right drive wheel 26 via right steering planetary drive 28. Drive wheels 22 and 26 are preferably rear wheels. The steering planetary drives 24 and 28 are preferably such as described in U.S. Pat. No. 5,390,751, issued 21 Feb. 1995 to Puetz et al., and assigned to the assignee of this application. Additional outboard planetaries (not shown), as provided on John Deere 8000T tractors, are mounted between the steering planetaries and the respective drive wheels, but are not further described because they are not directly involved in the subject matter of this application. A parking brake 30 is coupled to the output shaft of transmission 16, and left and right service brakes 32, 34 are coupled to the left and right drive wheels 22, 26, respectively. The vehicle also includes left and right steerable (preferably front) wheels 23 and 27 which are steered with a known Ackerman-type steering mechanism. The front wheels 23 and 27 may be either non-driven (shown) or driven (not shown).

The right angle gear 14 drives a variable displacement rear steering pump 40, such as a 75 cc, 90 series pump made by Sauer-Danfoss. The pump 40, in turn, powers a hydraulic fixed displacement rear steering motor 42, such as a 75 cc, 90 series motor, also made by Sauer-Danfoss. The steering motor 42 drives, via a cross shaft 44 and gear 46, a ring gear 47 of left planetary drive 24, and via cross shaft 44, gear 48 and reverser gear 50, a ring gear 52 of right planetary drive 28. The steering motor 42, the drives 24 and 28, and the components therebetween form the differential drive unit 49.

The steering pump 40 has a swashplate (not shown), the position of which is controlled by a swashplate control valve or electronic displacement control (EDC) 60. The EDC is preferably a two stage device with first stage including a flapper type valve operated by a pair of solenoids 59, 61, and a second stage including a boost stage to the pump, such as is used on the production John Deere 8000T Series tracked tractor.

An engine speed sensor 62, such as a commercially available mag pickup, provides an engine speed signal to a steering system unit (SSU) 70. The solenoids 59, 61 of valve 60 are controlled by pulse-width-modulated (PWM) pump control signals generated by SSU 70. The SSU 70 is communicated with the engine control unit 11.

An operator controlled steering wheel 74 is preferably connected to a non-spring centered input mechanism 72, such as described in U.S. patent application Ser. No. 09/991,961, filed 17 Dec. 1997, and assigned to the assignee of the present application. The input mechanism 72 includes an electro-magnetically controlled friction device or brake 75 and a rotary position transducer or incremental encoder 77, such as a commercially available Grayhill Series 63R optical encoder or Allegro A3425 dual Hall effect sensor. The encoder 77 provides to SSU 70 a steering wheel position value representing the position of operator controlled steering wheel 74. The encoder 77 generates a plurality, preferably 128, of pulses per each revolution of the steering wheel 74. The SSU 70 then repeatedly generates and updates a COUNT value representing the number of optical encoder pulses corresponding to the actual position of the steering wheel 74 relative to the position of the steering wheel 74 at start-up. The SSU 70 also receives signals from gear shift lever transducer 73, such as described in U.S. Pat. No. 5,406,860, issued 18 Apr. 1995 to Easton et al.

A drive line rotation speed sensor 76, preferably a differential Hall-effect speed sensor such as used on production John Deere 8000T tractors, is mounted in proximity to the final drive 20, and provides to the SSU 70 a variable frequency final drive speed or wheel speed signal. A magnetic ring 78 is mounted for rotation with the motor 42, and a Hall-effect transducer 80 mounted near the magnetic ring 78 provides to the SSU 70 an incremental motor position signal and a motor direction signal. A pair of clutch status switches 82 are located within the transmission 16 and are operatively associated with the linkage (not shown) between the clutch pedal (not shown) and the main clutch 18, and provide a clutch status signal to the SSU 70.

The right angle gear 14 also drives a front hydraulic steering pump 84. The pump 84, in turn, provides pressurized hydraulic fluid to a front steering valve 86 which controls front steering cylinders 88 and 90 which steer the left and right front wheels 23 and 27. The steering valve 86 is controlled by a front steering control signal generated by SSU 70. A steering angle sensor 92 generates a front steering angle signal which is communicated to the SSU 70.

Figure 2:
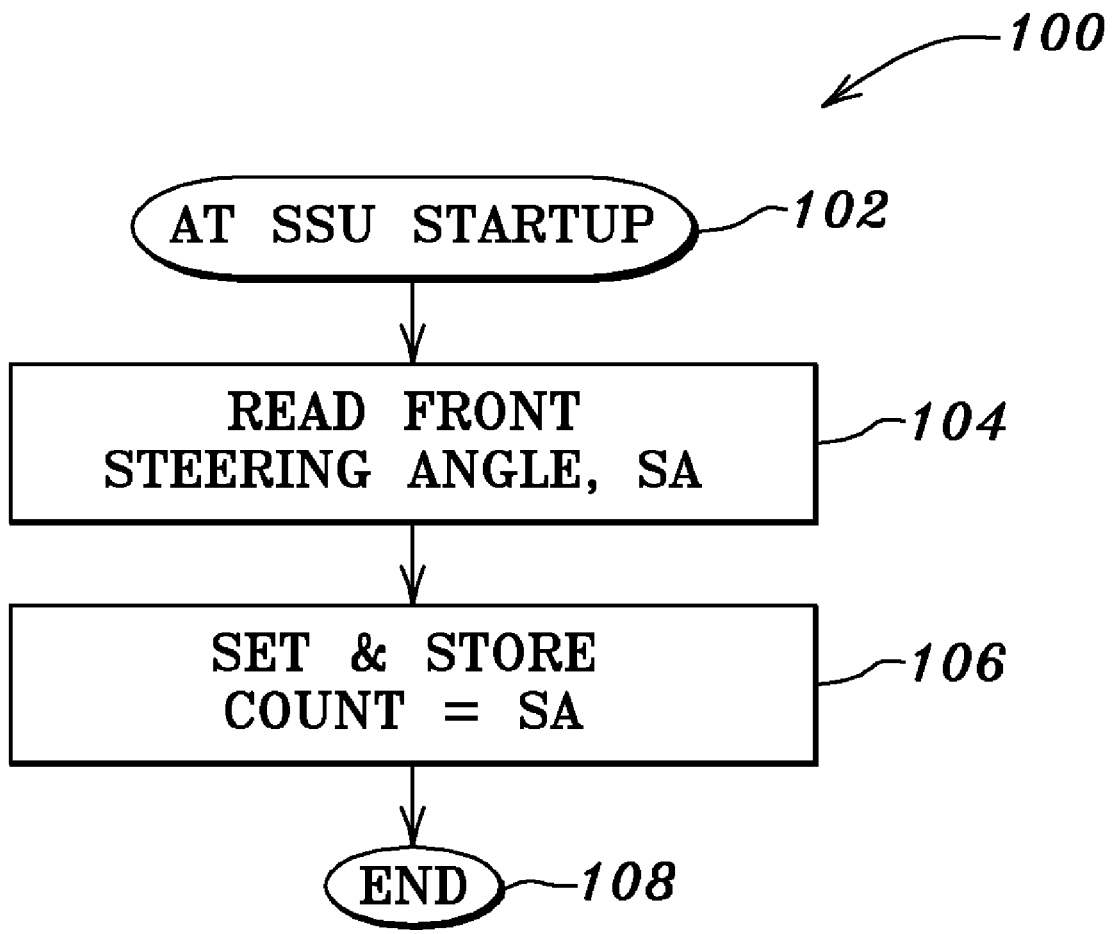
FIG. 2 is a logic flow diagram of a startup routine performed by the control unit of FIG. 1.
Figure 3:
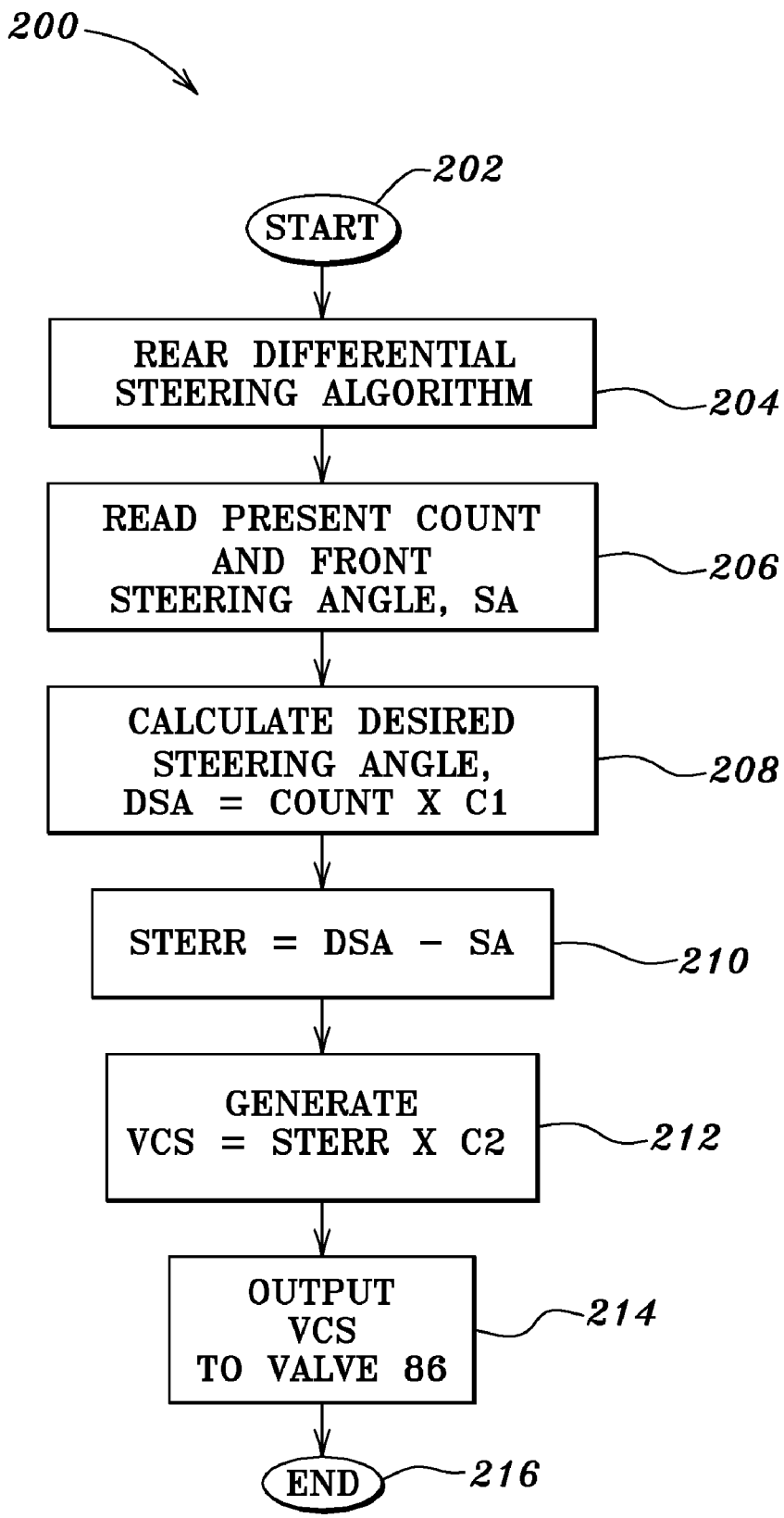
FIG. 3 is a logic flow diagram of a steering routine performed by the control unit of FIG. 1.

The SSU 70 includes a commercially available microprocessor (not shown) which executes the algorithms which are illustrated by FIGS. 2 and 3. The algorithm 100 of FIG. 2 is executed upon system startup. The algorithm 200 of FIG. 3 is preferably executed at a regular interval, such as every 20 milliseconds. The conversion of these flow charts into a standard language for implementing the algorithms described by the flow charts in a digital computer or microprocessor, will be evident to one with ordinary skill in the art.

As best seen in FIG. 2, algorithm 100 starts at step 102, and in step 104 it reads the front steering angle, SA, from sensor 92. Step 106 then sets and stores the value of COUNT to correspond to the steering angle read at step 104, after which algorithm 100 ends at step 108.

Referring now to algorithm 200 in FIG. 3, after starting at step 202, step 204 represents a known rear differential steering algorithm which operates to control the speed of the rear wheels 22 and 26 in a known manner so that they are driven to provide a differential steering operation such as the drive wheels of a tracked vehicle.

Then step 206 reads the current value of COUNT and then reads the current front steering angle from sensor 92.

Then, step 208 calculates a desired front steering angle SA(des) by multiplying COUNT by a first stored gain constant C1.

Then step 210 calculates a steering error STERR by subtracting the sensed steering angle, SA, from the desired front steering angle SA(des).

Then step 212 generates a front steering valve control signal VCS by multiplying STERR by a second stored gain constant C2.

Step 14 then outputs the control signal VCS to the front steering control valve 86, after which algorithm 200 ends at step 216.

As a result, the steering of the front wheels 23 and 27 is coordinated with the differential speed steering operation of the driven rear wheels 22 and 26, and the steering operation of the front and rear wheels is responsive to manipulation of the steering wheel 74, which after startup, controls the value of COUNT.

With this vehicle there is no need for a phasing operation wherein the steered wheels turned into phase with the steering sensor. It is desired to avoid such an automatic phasing of the steered wheels at startup because there could be obstructions in the path of the wheels or vehicle during the time of phasing, and this could surprise an unsuspecting operator. There is no need for a steering sensor that controls the velocity of steered wheel angle (commonly a joystick).

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle comprising:
a steering input sensor coupled to a steering wheel and generating a steering wheel position value;
Ackerman steerable front wheels;
differentially driven left and right rear drive wheels;
a steered wheel angle sensor coupled to the front wheels and generating a steered wheel angle signal;
a front steering unit for steering the front wheels in response to a front steering control signal;
a differential drive unit for driving the rear wheels in response to a rear drive/steering control signal;
a control unit coupled to the steering input sensor, the steered wheel angle sensor, the front steering unit and the differential drive unit, the control unit generating the front steering control signal and the rear drive/steering control signal, and the control unit coordinating differential driving of the rear wheels with steering operation of the front wheels, and upon startup, the control unit setting the steering wheel position value according to the steered wheel angle signal.

2. The vehicle of claim 1, wherein the control unit:
calculates a desired front steering angle value by multiplying the steering wheel position signal by a first constant;
calculates a steering angle error by subtracting the steered wheel angle signal from the desired front steering angle value; and
generates the front steering control signal by multiplying the steering angle error by a second constant.

* * * * *